Figure 1:
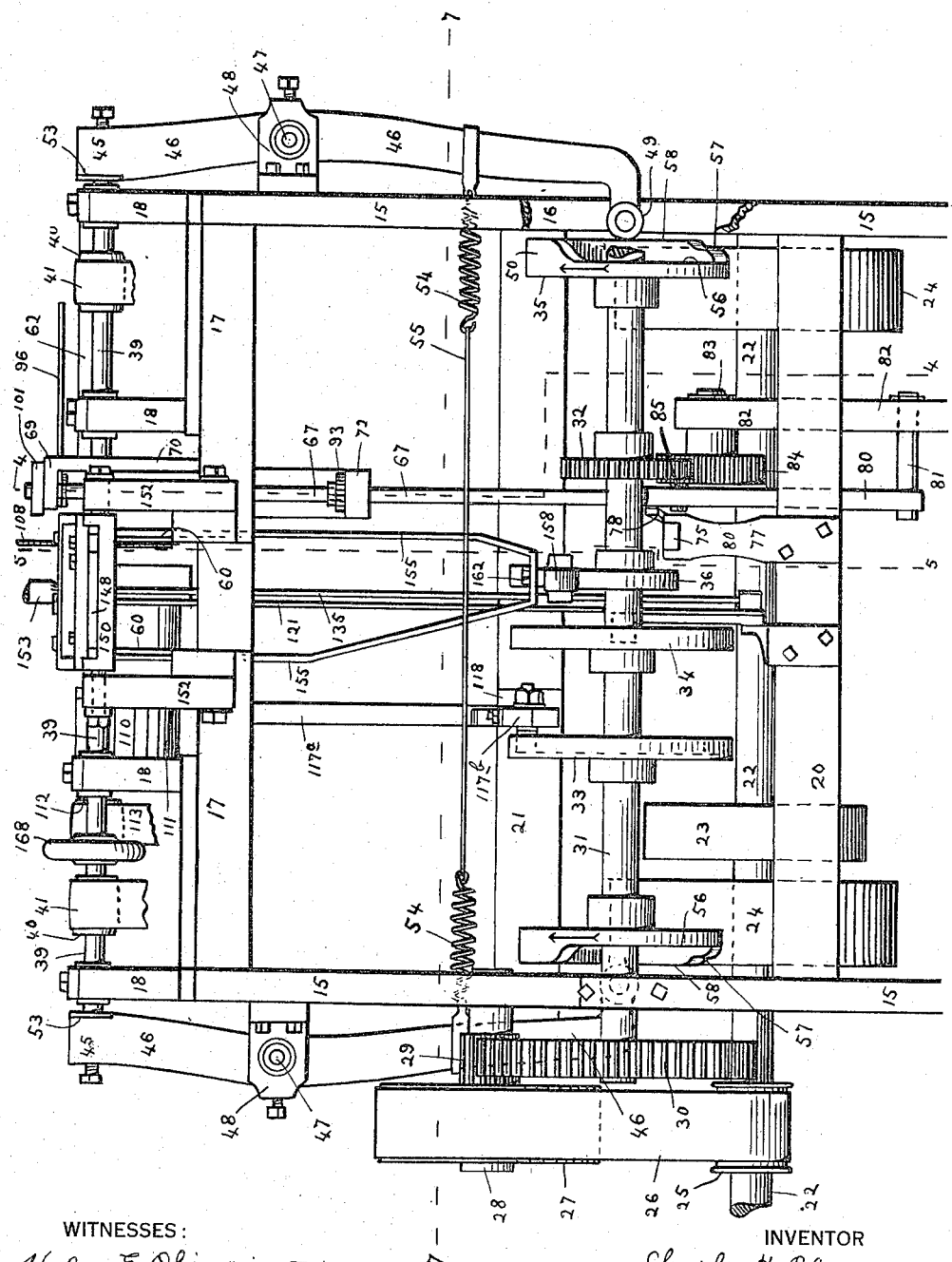

C. H. RHODES.
WOOD TURNING MACHINE.
APPLICATION FILED OCT. 28, 1915.

1,195,731.

Patented Aug. 22, 1916.
8 SHEETS—SHEET 4.

WITNESSES:
Helen E. Olin
Harriet Williams

INVENTOR
Charles H. Rhodes
BY Martin & Jones
ATTORNEYS

C. H. RHODES.
WOOD TURNING MACHINE.
APPLICATION FILED OCT. 28, 1915.

1,195,731.

Patented Aug. 22, 1916.
8 SHEETS—SHEET 7.

WITNESSES:
Helen E. Olin
Harriet Williams

INVENTOR
Charles H. Rhodes
BY Martin & Jones
ATTORNEYS

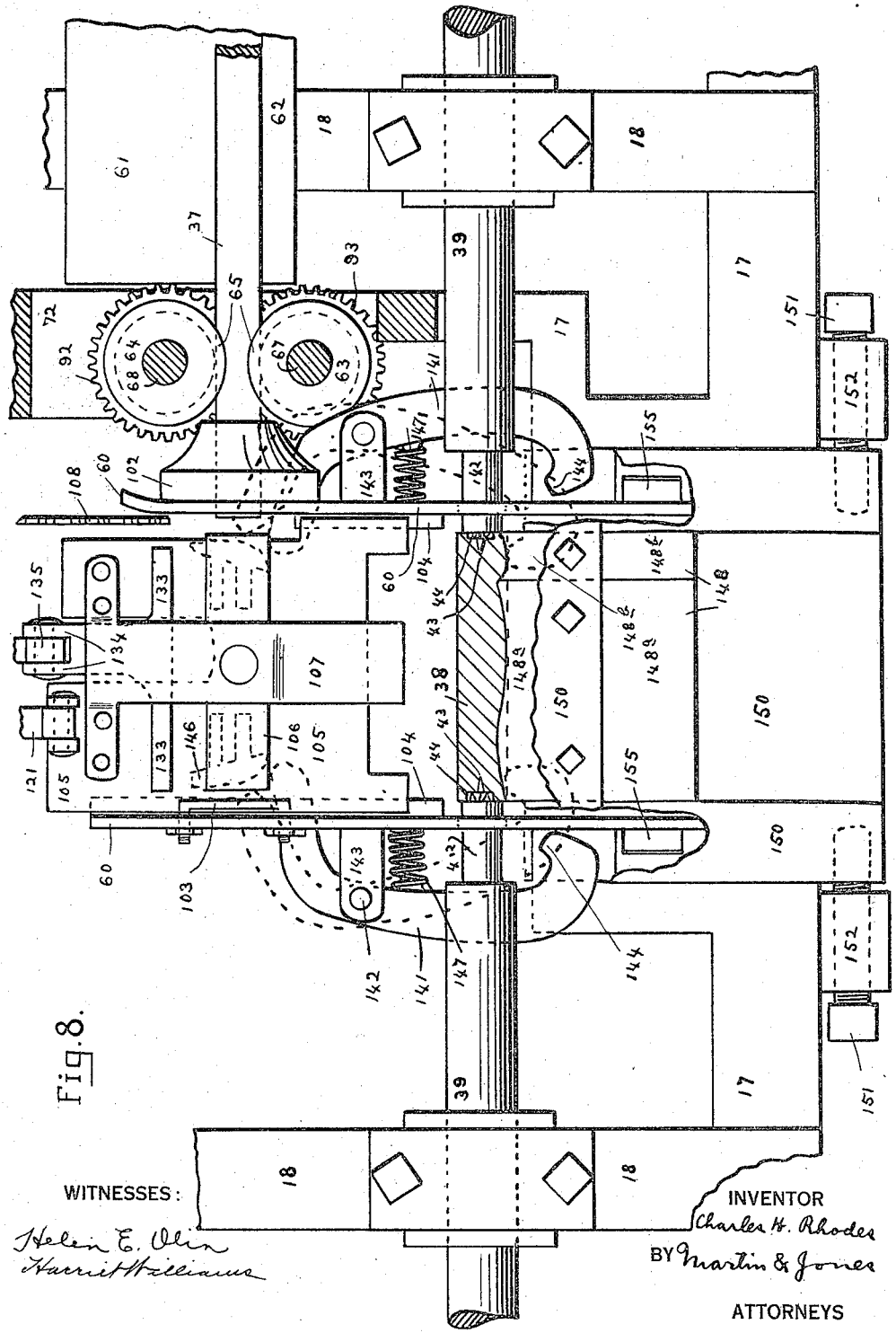

UNITED STATES PATENT OFFICE.

CHARLES H. RHODES, OF COLD BROOK, NEW YORK, ASSIGNOR OF ONE-HALF TO DANIEL F. STROBEL, OF HERKIMER, NEW YORK.

WOOD-TURNING MACHINE.

1,195,731.      Specification of Letters Patent.      Patented Aug. 22, 1916.

Application filed October 28, 1915. Serial No. 58,478.

*To all whom it may concern:*

Be it known that I, CHARLES H. RHODES, of Cold Brook, in the county of Herkimer and State of New York, have invented certain new and useful Improvements in Wood-Turning Machines; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to wood turning machines, and particularly to that class of wood turning machines adapted to saw a length of wood from a stick of wood supplied to the machine and automatically place said length of wood in the lathe, turn the length of wood to the desired extent and remove it from the lathe and to repeat said operations automatically and preferably also with great rapidity.

The purpose of my invention is to provide an improved machine of the character described and one which is efficient in operation and well adapted to perform the work required.

A further purpose of my invention is to provide a machine of the character described which is simple in construction, considering the number of operations that have to be performed by the machine upon each article.

Another purpose is to provide a machine of the character described, wherein the constantly operating parts such as the saw to cut the length of wood from the stick of wood and the lathe spindles are to a certain extent separated in the organization of the machine from the mechanisms which operate intermittently; and furthermore, to provide peculiarly simple and efficient means for obtaining the proper coöperation and sequence in the operation of the intermittently operating mechanisms such as the means to advance the stick of wood the proper distance, the means then to advance the saw and cut the length of wood from the stick, the means then to grasp and carry the length of wood to position between the lathe centers, the means to bring the lathe centers into holding position upon the length of wood, the means then to advance the cutting member toward the length of wood in the lathe and then to withdraw the knife and then the spindles from the length of wood.

A yet further purpose is to provide a machine of the character described so organized that the intermittently operating devices may be adjusted or timed relative to each other in order to bring about the best results under different circumstances or to adapt the machine to somewhat varying classes of work.

Another advantage obtained is to provide in a wood turning machine improved means for grasping the extended end of the stick of wood prior to said end or length being sawed from the stick, which means shall hold said length while and after it is being sawed off and then advance it to desired position between the lathe centers; and furthermore, to combine with the means for grasping and moving the length of wood into position between the lathe centers, means for preliminarily grasping the length of wood by means of single round projections upon the lathe centers so that the lathe centers will freely rotate in the length of wood while it is still held by the length holders and then after the length holders have been entirely withdrawn from the length of wood advancing the lathe centers farther toward each other into the ends of the length of wood, whereby other projecting members upon the lathe centers engage the length of wood and rotate the wood in the lathe. The purpose of this feature is to prevent the length of wood being torn from position between the lathe centers, which would be the result were the construction of the machine such as to begin to rotate the length of wood before the length holders had been withdrawn therefrom.

I have illustrated my invention in connection with a machine for automatically turning wooden clothes-pins and I consider the invention particularly efficient in such application, because the machine can be economically operated upon such work, in that it can produce such a great number of such relatively cheap articles. It will be understood, however, that the application of my invention is not limited to clothes-pin making machines, but may be advantageously applied to the production of various small wooden articles which are to be manufactured from short lengths of wood cut by the same machine from longer lengths of wood supplied to the machine.

A further purpose of this invention is to produce a machine of the character described, having certain advantages in the construction and combination of its parts and sub-mechanisms which will more fully appear from the description thereof and claims thereupon hereinafter set forth.

Another object of my invention is to provide in combination with a machine of the general type described improved means for preventing the turned object from flying up out of the machine when the object is released from between the two centers.

Further purposes and objects of my invention will appear from the specification and claims herein.

Figure 2:
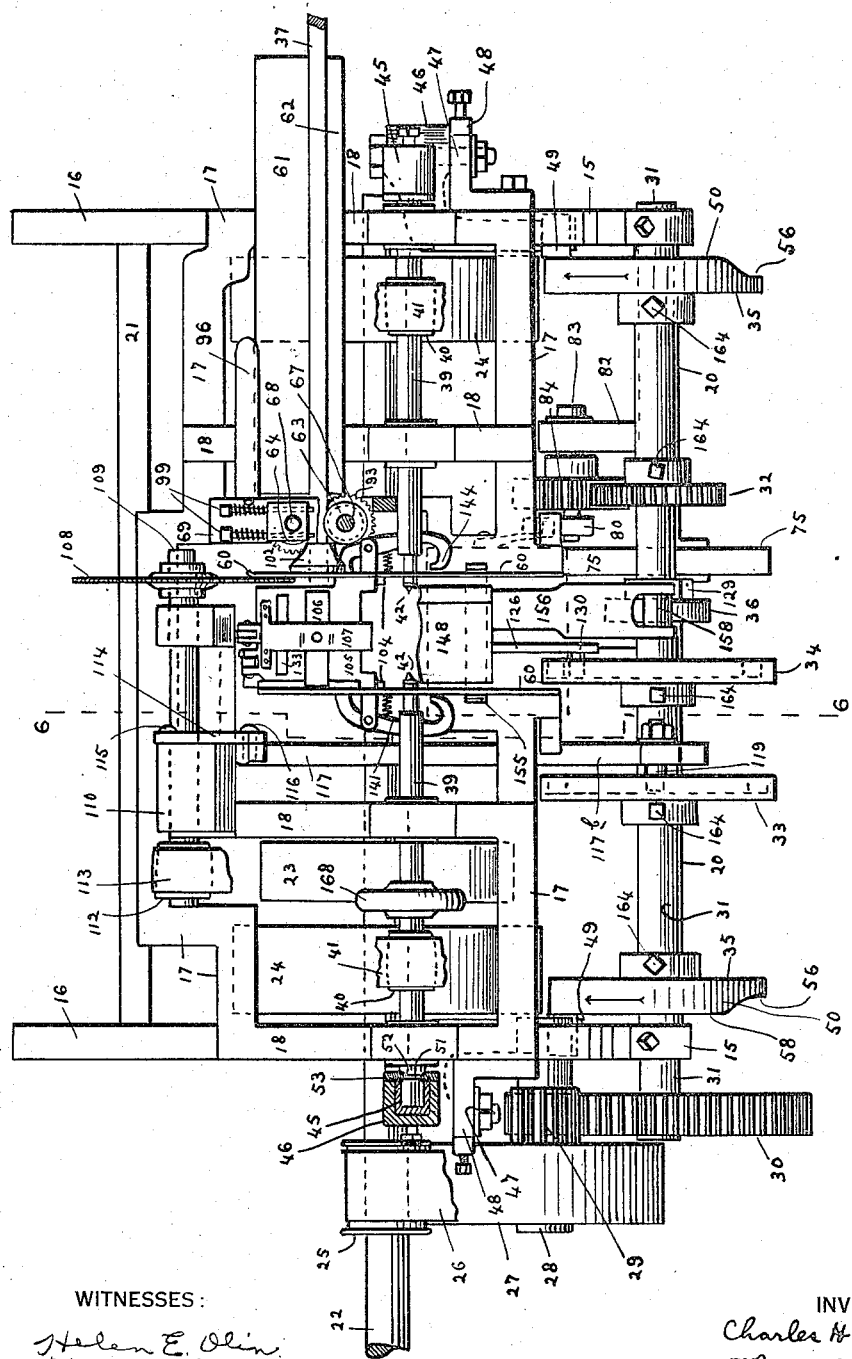
Figure 3:
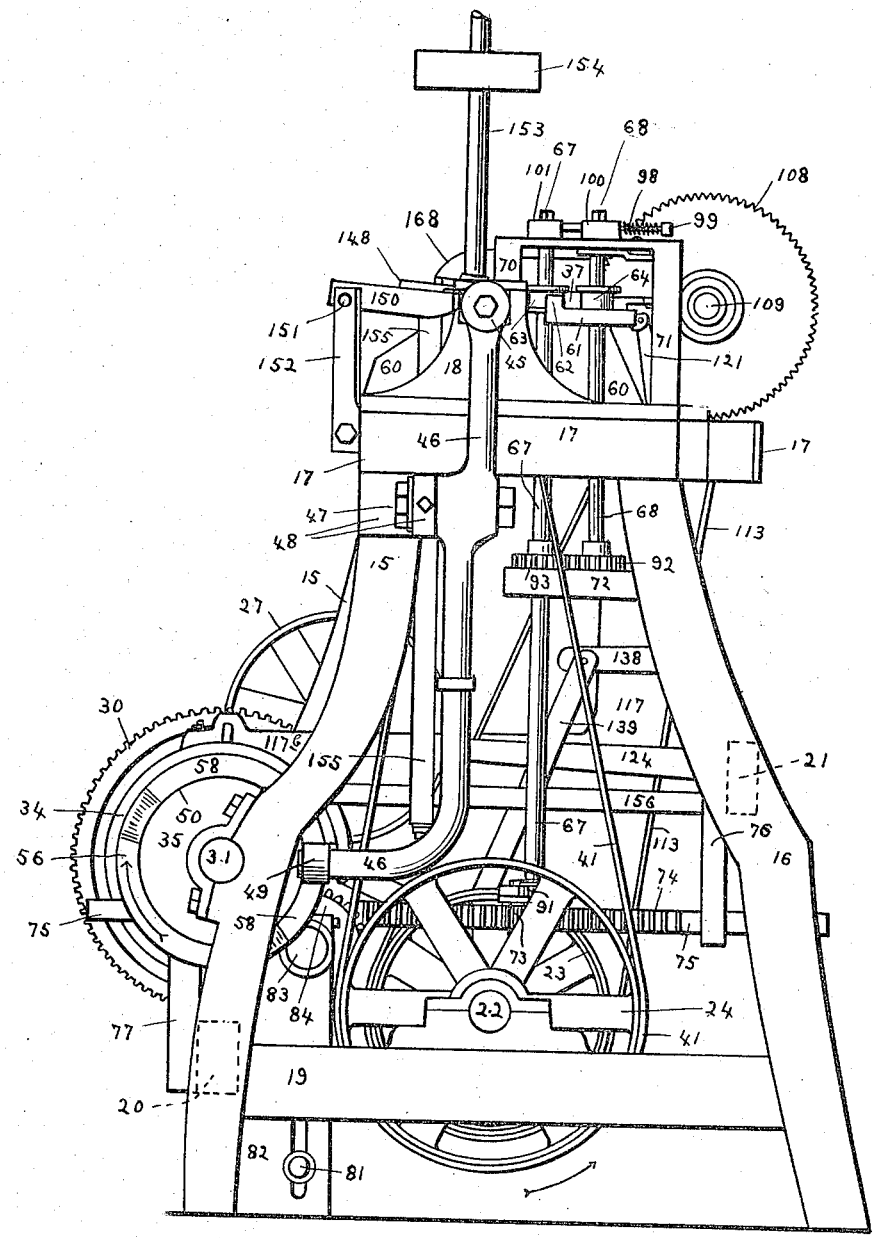
Figure 11:
Figure 4:
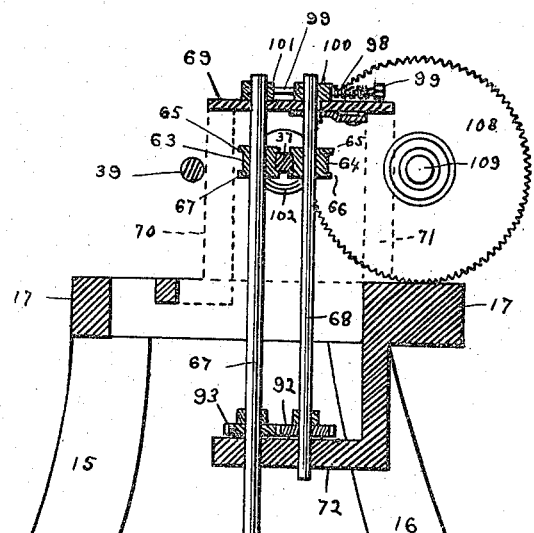
Figure 5:
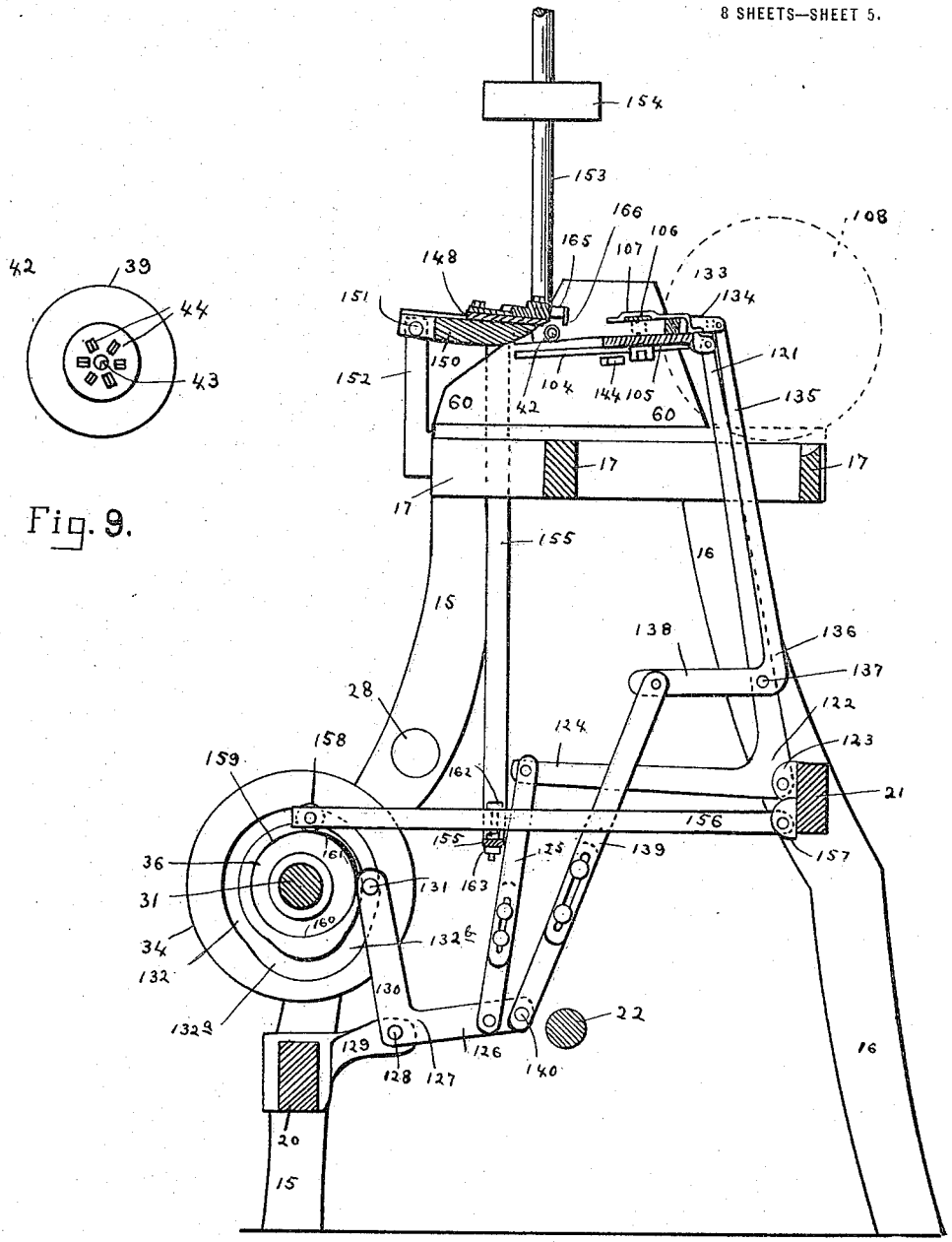
Figure 6:
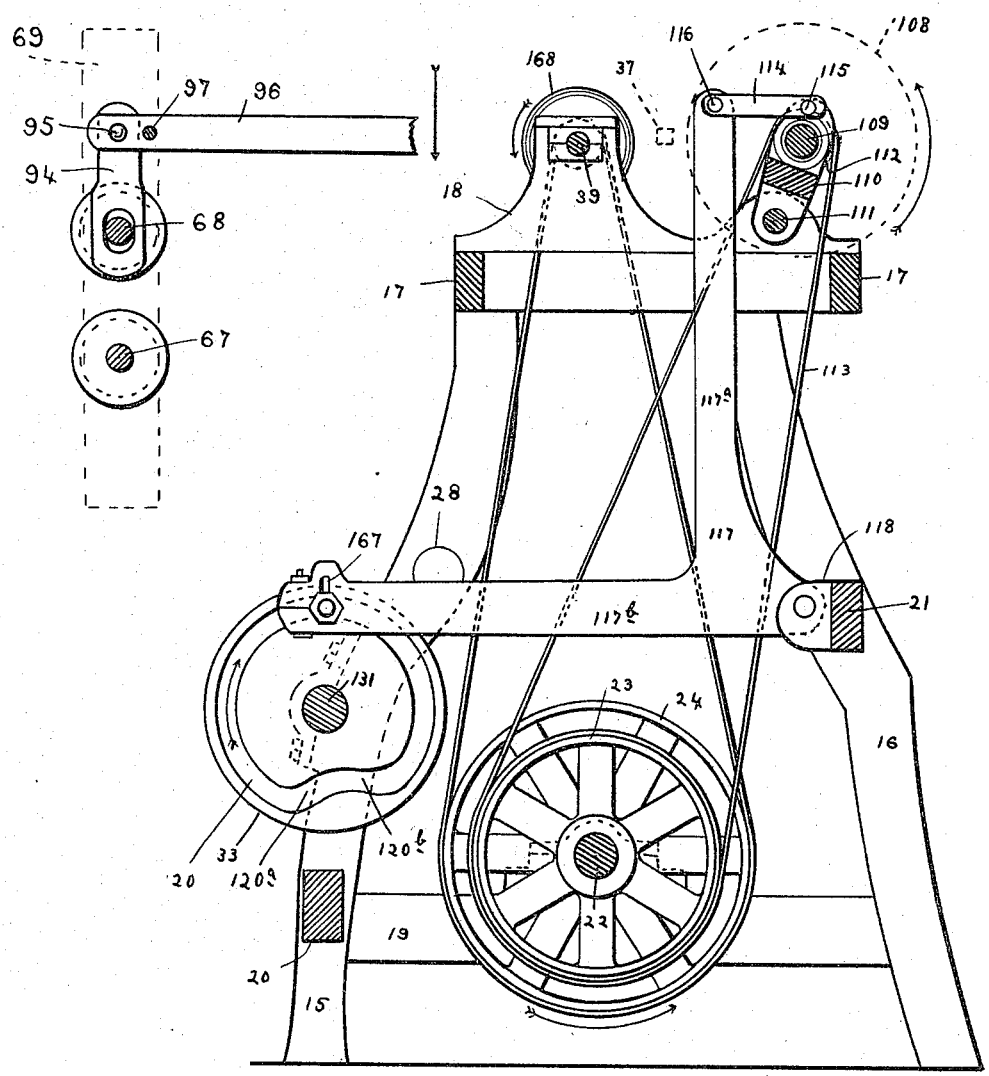
Figure 7:
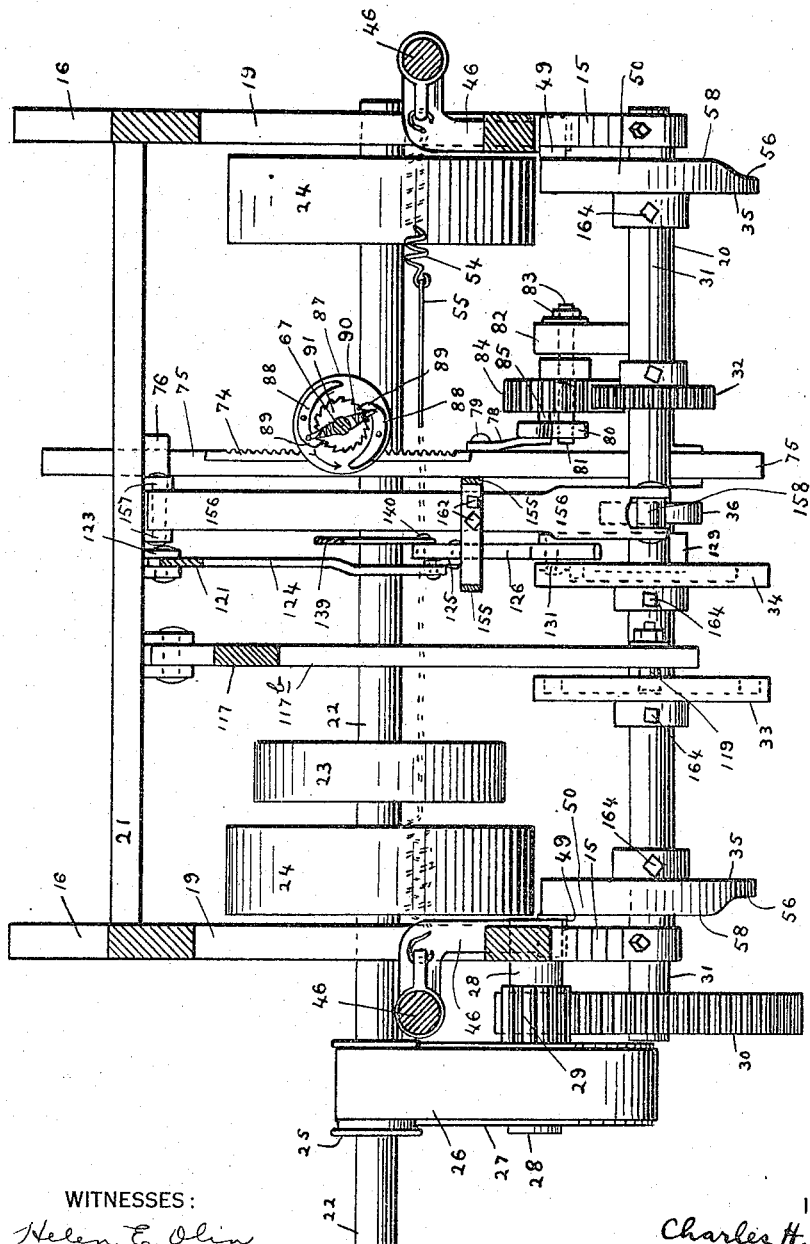

Figure 1 is a front elevation of a wood turning machine embodying my invention, certain parts of the machine being cut away or eliminated in order to more clearly show the construction as a whole. Fig. 2 is a top or plan view of the said machine. Fig. 3 is an end elevation of the machine as viewed from the right-hand end of Figs. 1 and 2, only a few of the parts beyond the end of the machine being shown in order to avoid confusion. Fig. 4 is a vertical sectional view of the parts immediately adjacent to section line 4—4 in Fig. 1. Fig. 5 is a similar sectional view of parts immediately adjacent to section line 5—5 in Fig. 1. Fig. 6 is a similar sectional view of parts immediately adjacent to section line 6—6 in Fig. 2. Fig. 7 is a horizontal sectional view of the machine upon line 7—7 of Fig. 1. Fig. 8 is a top or plan view on an enlarged scale of the lathe centers, the means for grasping, advancing and stopping the length of wood and the knife and its holder, certain parts being broken away to more clearly show the construction. Fig. 9 is an end view of one of the lathe centers on a scale still larger than used in Fig. 8. Fig. 10 is a detail plan view on an enlarged scale of the quick release for the feed rollers. Fig. 11 is a side view of a clothes pin turned by my machine.

Referring to the figures in a more detailed description, the frame of the machine consists of two front legs 15, 15 and two rear legs 16, 16 rigidly supporting an irregularly-shaped top frame 17, at each end of which top frame as well as part way toward the center from each end are provided top crosspieces 18 extending from front to rear of the said top frame 17 and at about their central part extending upward above the plane of the top frame 17. At each end of the frame the front and rear legs 15 and 16 are connected by strong lower end crosspieces 19. The front legs are connected by a lower front crosspiece 20 well down toward the lower end of the legs and the rear legs are connected about midway of their height by a strong rear crosspiece 21.

Journaled in suitable bearings provided upon the oppositely disposed lower end crosspieces 19 there is provided a power-driven main shaft 22 upon which are fixed to revolve therewith a saw-drive pulley 23 and two lathe-drive pulleys 24, one lathe-drive pulley toward each end of the machine.

Beyond the left end of the machine frame there is provided upon the main shaft 22 a small pulley 25 connected by belt 26 to a larger pulley 27, which with pinion 29 rotating with pulley 27 is mounted upon a stub-shaft 28 projecting from the left front leg 15 of the machine frame. Pinion 29 is in mesh with a much larger gear wheel 30 secured upon the projecting end of cam shaft 31, which shaft is mounted in suitable bearings provided upon front legs 15 of the frame of the machine. It will thus be seen that cam shaft 31 while being driven from main shaft 22 rotates at only a small fraction of the speed of the said main shaft.

The various cam wheels or gear wheels for operating the different intermittently operating sub-mechanisms of the machine are all mounted upon and secured to the said cam shaft 31 and are so coöperatively connected to the different sub-mechanisms as to produce a complete operation of the wood turning machine at each complete rotation of the said cam shaft 31 and the said cams and gear wheels are so arranged upon said cam shaft as to bring the different sub-mechanisms of the machine into operation at the proper time. The said wheels so mounted upon the cam shaft 31 are as follows: The gear wheel 32 for operating the means for feeding the stick of wood 37 forwardly lengthwise of the machine; the saw controlling cam wheel 33; the cam wheel 34 for moving the means for grasping the length of wood 38 while it is being sawed and carrying the said length of wood to position between the lathe centers; two cam wheels 35 located respectively just within the ends of the frame; and the cam wheel 36 for controlling the position of the knife or cutting means of the lathe.

Oppositely disposed to and in alinement with each other are mounted the two lathe spindles 39 each journaled in bearings provided in the upwardly projecting central part of the top cross-pieces 18; namely, one spindle mounted in the right-hand end top crosspiece 18 and in the top crosspiece adjacent thereto toward the middle of the machine, while the other spindle 39 is mounted in the left-hand end top crosspiece 18 and in the crosspiece next adjacent thereto toward the center of the machine. Between its two bearings each lathe spindle 39 has mounted thereon and secured thereto a small pulley 40 connected by belt 41 to the lathe-drive pulleys 24 mounted below upon the main shaft 22.

The adjacent ends of the oppositely disposed lathe spindles 39 are for a short distance from their ends of reduced diameter and the ends of said spindles form the lathe centers 42 of the machine and are made with centrally arranged round tapering or pointed ends 43 immediately back of which there are provided laterally or radially projecting wings 44. It will be seen that when the length of wood 38 is engaged simply by the round pointed ends 43, the length of wood if otherwise grasped will not be rotated by the lathe centers 42, but will be rotated by the lathe centers as soon as the wings 44 come into engagement with the ends of the said length of wood.

The lathe spindles 39 are adapted to slide a short distance back and forth toward and from each other in their bearings so as to grasp the length of wood 38 brought therebetween first preliminarily by the pointed ends 43 and then by the wings 44 and then upon the centers receding from each other to disengage themselves entirely from the turned length of wood. The means for obtaining these longitudinally reciprocating movements of the lathe spindles and their lathe centers are as follows: The outer end of each lathe spindle 39 projects beyond the bearing in the end top crosspiece 18 and fits loosely into a socket 45, preferably having a brass lining provided in the upper end of a lever 46 pivotally mounted at 47 in a bracket 48 projecting outwardly from the end of the machine frame as by being secured to the front leg 15. Said lever then extends downwardly and inwardly as shown in Fig. 1 and also forwardly as shown in Fig. 3 and is provided at its lower end with an anti-friction roller 49 bearing against the outwardly and laterally extended cam flange 50 upon the cam wheel 35 on cam shaft 31 at that end of the machine. The cam wheel 35 rotates with its shaft 31 in the direction indicated by the arrows in Figs. 1 to 3. It will now be obvious that outward movement imparted to the lower end of spindle lever 46 by means of cam wheel 35 will force the lathe spindle 39 connected to said lever inwardly or toward the opposite lathe spindle 39. An encircling groove 51 provided upon the spindle 39 at the surface of the socket 45 is engaged by inwardly extending portions 52 on a yoke or collar 53 secured to the inner surface of the upper end of lever 46, whereby the spindles 39 are drawn outwardly as the upper end of lever 46 moves outwardly through the lower end of said lever 46 moving inwardly under the tension of spring 54 becoming operative as soon as cam wheel 35 presents a low part of its flange cam to the roller 49. Such yielding tension from spring 54 may be secured from said spring being connected at one end to the lower portion of lever 46 and being connected at its other end to a portion of the frame or as shown by a rod 55 extending lengthwise of the machine to the corresponding spring 54 of the other spindle lever 46. By reference to Figs. 1, 2 and 3 it will be seen that the cam wheel 35 has its cam flange 50 provided with a low portion 56, which when engaging roller 49 of the spindle lever 46 allows the spindles 39 to come to withdrawn position and that following said low portion of the cam flange 50 in the order of its engagement by the roller 49, there is a short portion 57 rising somewhat above the level of low portion 56, but not as high as the succeeding high and long portion 58 of said cam flange 50. The height of the intermediate portion 57 is such that during the short time the roller 49 is engaged therewith the spindle 39 at each end of the length of wood 38 is moved inwardly sufficient to grasp and support said length of wood by means of the round tapering points 43 upon the lathe centers and so not produce rotation of the length of wood, but as soon as the high portion 58 comes into contact with the roller 49, the spindle 39 is pressed inwardly enough farther to bring its wings 44 into the ends of the length of wood and cause said length of wood to be rotated thereby as long as the roller 49 is engaging the relatively long high portion 58 of cam wheel 35. As the high portion 58 of said cam wheel 35 passes from engagement with roller 49 the said roller is allowed to move inwardly through the action of spring 54, producing an outward movement of spindle 39, which withdraws the lathe center entirely from the length of wood. Said withdrawal of the lathe centers from the wood is made positive in its action through the lathe centers receding through apertures 59 in upstanding walls 60, which walls if necessary push the turned length of wood from either lathe center. The two walls 60 are spaced apart a little more than the length of the piece of wood to be turned by the machine and extend from the front of the top frame 17 back some distance beyond the line of the spindles 39 for the purposes hereinafter described.

Secured in any desired way to the frame of the machine to the rear side of the right-hand spindle 39 and preferably at substantially the level of the spindles 39 there is provided a horizontal rest 61 for the stick of wood 37, said rest having at its edge toward the spindle an upstanding flange 62, against which the stick of wood may be pressed to insure its being fed straight forward and between the two oppositely disposed feed rollers 63 and 64. These feed rollers are provided with upper and lower peripheral flanges 65 and 66 respectively to prevent vertical displacement of the stick of wood and the said feed rollers 63 and 64 are fixedly mounted upon vertically arranged shafts 67 and 68 respectively. Above feed roller 63 the shaft 67 is journaled in a horizontal bridge 69 supported upon forward and rearward standards 70 and 71 upstanding from the top frame 17 of the machine and some distance below the said top frame 17 the said vertical shaft 67 is journaled in a hanger 72 depending from the frame of the machine. From this hanger the shaft 67 extends downwardly and near its lower end is provided with a gear wheel 73 loosely mounted upon said shaft and meshing with the projections upon a rack 74 provided upon the side of a rod 75 horizontally arranged and extending from front to rear of the machine and slidingly supported at its rear end in a hanger 76 depending from the rear crosspiece 21 and at its front slidingly mounted in a support 77 upstanding from the front crosspiece 20. A back and forth or reciprocating movement is imparted to the rod 75 and thereby to the rack 74 at each rotation of the cam shaft 31 by means of a link 78 being pivoted at 79 to the rod 75 to the left of gear wheel 73 as indicated in Fig. 4 while the other end of said link is pivoted to the upper end of a lever 80, which lever is pivoted at its lower end upon an adjustably mounted finger 81 projecting from a short upright 82. The upright 82 is made a part of the rigid frame of the machine by being secured at its front edge to the lower front crosspiece 20. Near the upper end of the upright 82 there is provided a stub-shaft 83 extending longitudinally of the machine and having mounted thereon a gear wheel 84 of the same size as and in mesh with the gear wheel 32 mounted on and revolving with the cam shaft 31. From its side opposite from the upright 82 the gear wheel 84 is provided with an outwardly projecting lug 85 projecting into a longitudinally arranged slot 86 near the upper end of the pivotally mounted lever 80. It will now be seen that the rotating movement imparted to gear wheel 84 from the gear 83 will impart a reciprocating movement to the rod 75 and rack 74 and that thus gear wheel 74 will be rotated alternately in one direction and then in the other direction at each rotation of the cam shaft 31.

At its upper surface the gear wheel 73 extends outwardly, forming a flange 87 upon which as shown particularly in Fig. 7 there are mounted two oppositely arranged ratchets 88, the short and operative ends 89 of which are drawn inward by spring 90 to bear against the teeth of ratchet wheel 91 located between the said ratchets and fixed upon said vertical shaft 67 immediately above the gear wheel 73. The arrangement of said ratchet wheel and ratchets is such that upon the rack 74 moving to the right, as shown in Fig. 4, the ratchets 88 ride past the teeth upon ratchet wheel 91 without moving the same, and therefore no movement is communicated to shaft 67, but upon rod 75 moving to the left as viewed in Fig. 4 the operative ends 89 of said ratchets strike into the teeth of said ratchet wheel 91 and rotate the same in the direction indicated by the arrow thereon in Fig. 7 and thereby shaft 67 and the feed roller 63 is rotated in the same direction. When the feed roller 63 is rotating as just above described, the oppositely placed feed roller 64 is rotating in the opposite direction, thus imparting a forward feed to both sides of the stick at the same time through the shaft 68, upon which the feed roller 64 is mounted, being provided with a gear wheel 92 in mesh with a gear wheel 93 upon shaft 67, said gear wheels being conveniently located just above the depending hanger 72.

A hand-operated quick release is provided to separate the feed rollers 63 and 64, should it be necessary at any time to withdraw from therebetween a stick which has been grasped by the feed rollers. This quick release as illustrated in detail in Fig. 10 consists of a yoke 94 apertured at one end to loosely fit about the shaft 68 just below the bridge 69, while the rearward end of the yoke is pivoted at 95 to a lever 96, which is pivoted at 97 to the bridge 69; while the other end of the lever 96 extends longitudinally of the machine or to the right as viewed in Figs. 2 and 10, so that a movement of the handle or outer end of said lever 96 to the front will operate to draw the upper end of shaft 68 to the rear, and so withdraw feed roller 64 from contact with the stick, the aperture in bridge 69 through which the shaft 68 projects being sufficiently lengthened to allow such slight movement of shaft 68. Normally, shaft 68 and thereby feed roller 64 are drawn toward feed roller 63 through the tension of springs 98 mounted upon bolts 99 between the heads of said bolts and a block 100, in which the upper end of shaft 68 is journaled. Said bolts 99 extend loosely through said block 100 into a similar block 101 mounted about the upper end of shaft 67.

Immediately beyond the feed rollers 63 and 64 the advancing end of the stick of wood passes through a strong encircling guide 102 and then through an aperture in the right-hand wall 60. From here during the intermittent feed motion of the feed rollers the end of the stick of wood is advanced nearly to the other or left-hand wall 60, where the end of the stick of wood comes against an adjustable stop 103.

The walls 60 extend from the front side of the top frame 17 rearwardly beyond the guide 102 and are secured in position by being attached at several places to the frame of the machine. Slidingly mounted between said walls 60 as by being mounted upon slideways 104 is a movable platform 105, upon which the stick of wood rests as it is projected through the guide 102 and the right-hand wall 60. Mounted over said platform 105 is a leaf spring 106 located and tensioned to bear downwardly upon the stick of wood as it is fed over said platform. The leaf spring 106 is held in position by being affixed to another leaf spring 107, which is secured to the rear end of the platform 105. The adjustably located stop 103 to one side of the platform 105 is provided in order to more accurately and positively fix the length of the piece of wood to be sawed off from the stick than can be done simply by the feed rollers, the feed rollers being sufficiently yielding in their contact with the stick of wood to slip without difficulty when the stick has been advanced against the stop 103. It will be understood that the feed rollers 63 and 64 are so constructed and connected as to advance a sufficient length of wood, while the adjustable stop 103 is provided for slight variations in the length of article to be produced.

After the feed rollers have advanced the stick of wood the proper length and said feed rollers have ceased to operate and while the projected end of the stick of wood is grasped between the platform 105 and the leaf spring 106, while the remaining length of the stick of wood is securely held stationarily by the guide 102 and feed rollers 63 and 64, the length of wood 38 projecting beyond the right-hand wall 60 is sawed from the stick of wood by a circular saw 108 momentarily advanced against said stick of wood. The mechanism for running and moving said circular saw is plainly illustrated, especially in Fig. 6. The circular saw 108 is mounted upon the projecting end of saw shaft 109, which is mounted in the upper part of a cradle 110 rockingly mounted upon a rod 111 suitably supported by parts of the top frame and extending longitudinally of the machine. A small pulley 112 upon said saw shaft 109 is connected by belt 113 to the saw-drive pulley 23 upon the main shaft 22. The normal inoperative position of the saw and its cradle and attached parts is shown in Fig. 6. Once in each rotation of the cam shaft 31 and at the proper time in said rotation the saw is momentarily brought forward into operation through a connecting link 114 pivotally secured at 115 to the upper part of the cradle 110 while its other end is pivotally secured at 116 to the upper end of the upstanding arm 117$^a$ of a bell crank 117, which is pivotally mounted between ears 118 projecting forwardly from the rear crosspiece 21. The horizontal arm 117$^b$ of the bell crank 117 is provided at its forward end with a laterally extending pin 119 projecting into a cam groove 120 provided in one side of cam wheel 33 mounted upon cam shaft 31. Most of the cam groove 120 lies in a circle at a sufficient distance from the axis of said cam wheel to maintain the bell crank 117 and thereby the saw 108 in the position indicated in Fig. 6; but one portion as 120$^a$ of the cam groove 120 slants inwardly and is followed then by portion 120$^b$ slanting outwardly to the usual circle of the cam groove. As the cam wheel 33 rotates clock-wise, as viewed in Fig. 6, it will be obvious that upon the slanting or cam portion 120$^a$ of the cam groove engaging the pin 119 said pin will be moved downwardly and then by the portion 120$^b$ returned to its normal position, resulting in the saw cradle 110 being rocked to the left, as viewed in Fig. 6, sufficiently to move the rotating saw 108 through the path occupied by the stick 37 and thereby cut the projecting length 38 from said stick and immediately thereafter the saw will be returned to normal position.

Immediately before the length of wood 38 is sawed off from the projecting end of stick 37 the said projecting length was grasped as hereinbefore described between leaf spring 106 and movable platform 105 and the hold of said parts upon the projecting length is sufficient to hold the length thus sawed off in position upon the platform while the saw is completing its operation and returning to normal or inoperative position. Immediately upon the saw completing its operation of severing the length of wood 38 from the stick of wood 37 the means for holding and carrying said severed length to position between the lathe centers come into operation. First the length of wood is moved forward by means of the movable platform 105 and its leaf springs 106 and 107 moving forward bodily, carrying grasped therebetween the said length of wood. Said movable platform 105 slides forwardly between the opposite walls 60 upon the slideways 104 until the forward end of the platform is just below the lathe centers 42. This forward movement of the platform 105 is produced by the rear end of said platform being pivotally connected to the upper end of the upstanding arm 121 of bell crank 122 pivoted between forwardly extending ears 123 upon the back crosspiece 21, while the other arm 124 of said bell crank extends forwardly and has its forward end pivotally connected to the upper end of link 125, which at its lower end is pivoted to the rearwardly extending arm 126 of bell crank 127 pivotally mounted at 128 upon a bracket 129 extending rearwardly from and secured to the lower front cross-piece 20. The other arm 130 of bell crank 127 extends upwardly and is provided near its upper end with a laterally extending finger 131, extending into a cam groove 132 provided in one side of the cam wheel 34 mounted upon the cam shaft 31. Cam groove 132 is provided in the proper relative position with an outwardly slanting portion 132$^a$ followed thereafter with the inwardly slanting portion 132$^b$. It will now be obvious that as cam wheel 34 rotates clock-wise, as viewed in Fig. 5, the outwardly slanting portion 132$^a$ of the cam groove coming into engagement with pin 131 will operate through the bell cranks and other parts just described to move the platform 105 forwardly upon its slideways and that said platform will be immediately thereafter returned to retracted position through the pin 131 being again moved toward the center of the cam wheel 34 through the inwardly slanting portion 132$^b$ of the cam groove.

It will be noted, however, that the moving of the platform 105 forward until its forward end is below the lathe centers 42 will not of itself bring the length of wood 38 between the lathe centers, because said length of wood was grasped between the platform and the leaf spring 106 about midway of the length of said platform. Further means therefor are provided to move the said length of wood forward upon the platform and these means are so arranged as to go into operation as soon as the platform 105 begins to move forward and so as to bring the length of wood to the forward end of the platform as soon as the platform comes to forward position. These additional means for moving the length of wood include a pusher 133 located between the platform 105 and the leaf spring 107 and arranged longitudinally of the machine or parallel to the length of wood held upon the platform. To rearwardly extending ears 134 on said pusher is pivotally connected the upper end of upstanding arm 135 of bell crank 136 pivoted at 137 to the upstanding arm 121 of bell crank 122 a little way above the ears 123. The forwardly extending arm 138 of bell crank 136 is connected at its forward end to the upper end of connecting link 139, the lower end of which is pivotally connected at 140 to the rearwardly extending arm 126 of bell crank 127 above described. It will be obvious that as bell crank 127 is moved, the pusher 133 will be moved forwardly and then rearwardly at the same time the platform 105 is moved. It will be seen moreover that pusher 133 will be moved a greater distance by reason of link 139 being attached farther out on arm 126 than is link 125 and by reason of arm 138 of bell crank 136 being much shorter than is the forward arm 124 of bell crank 122. This greater movement of the pusher 133 is further accelerated by reason of bell crank 136 being mounted part way up on the arm 131 of bell crank 122 instead of being on a stationary pivot. Forward movement of the pusher 133 soon brings the pusher against the length of wood beneath the leaf spring 106 and then gradually pushes it forward upon the platform 105, while still leaving it held between the platform and the forwardly extending leaf spring 107, the lower surface of which is on a level with the lower surface of leaf spring 106.

In order to stop the forward movement of the length of wood 38 at the proper point to center the same between the lathe centers 42 or to center the same more accurately and positively than would be done with the carrying means, including said platform, leaf springs and pusher, there are provided two oppositely arranged, pivotally mounted arms 141. These arms are pivotally mounted intermediate of their length at 142 upon ears 143 projecting outwardly from the walls 60. The forward ends 144 of said arms are turned inwardly and adapted to move inwardly through apertures in the walls 60, to positions shown in dotted lines in Fig. 8 just a little closer together than the lathe centers and at the right distance forwardly of the lathe centers to form stops engaging the front side of the length of wood near both ends of said piece of wood. The forward ends 144 of said arms 141 are moved inwardly at the proper time through the rearward ends 145 of said arms being turned inwardly and coming into camming engagement with cam lugs 146 suitably and adjustably located upon the lower surface of platform 105 so that as the platform 105 starts forward, both arms 141 are moved so as to bring the forward ends toward each other and into proper position to stop the length of wood 38 at the right position between the lathe centers 42.

While the length of wood 38 is thus temporarily held in position between but not in contact with the lathe centers 42, the said lathe centers move inwardly or toward each other sufficiently to cause the two round points 43 on said lathe centers to enter the opposite ends of said length of wood and thus preliminarily hold said length of wood between the lathe centers, said round points 43 meanwhile turning harmlessly in the ends of the length of wood until the forward ends 144 of arms 141 are withdrawn sufficiently to be out of the way and until the pusher 133 and platform 105 and its leaf spring 107 are all likewise withdrawn sufficiently to be out of the way. This preliminary inward movement of the lathe centers to the extent of the round points 43 only engaging the length of wood is caused by the cam wheels 35 having presented the intermediate portions or steps 57 of its cam flange to the rollers 49 of cam levers 46 as hereinbefore described.

As soon as the round points 43 of the lathe centers have thus engaged the length of wood and rendered the support thereof by levers 141, platform 105, leaf spring 107 and pusher 133 unnecessary, said platform and leaf spring and said pusher are withdrawn by the rearward movement of upstanding arms 121 and 135 respectively as hereinbefore described and the forward ends of levers 141 are withdrawn through the withdrawal of platform 105 removing the cam lugs 146 from engagement with the rearward ends 145 of said levers, whereupon the forward ends of said levers are withdrawn under the tension of springs 147 interposed between the said forward ends of the arms and the adjacent walls 60.

By the time the above-mentioned various carrying and positioning means are sufficiently withdrawn from the length of wood the lathe centers 42 move inwardly upon the length of wood and bring the laterally or radially extending wings 44 of said lathe centers into biting engagement with the opposite ends of the length of wood and thereby positively rotate the length of wood in the lathe. This further inward movement of the lathe centers is produced by the further rotation of the cam wheels 35 having brought the high portions 58 of the cam flange 50 of said cam wheels into engagement with the rollers 49 of the spindle levers 46 as hereinbefore described. The length of wood now in the lathe is ready to be turned and as that operation consumes a much longer time than any of the other operations it will now be noted that the high portions 58 of the cam flange 50 extend substantially half-way about said cam wheels, thus holding the length of wood firmly gripped to rotate with the lathe centers during substantially half a rotation of the cam shaft 31.

The cutting member or knife 148 and the means for operating the same are especially shown in Fig. 5. The said knife consists of a main portion 148ª adapted to shape the body of the clothes-pin and a smaller or narrower section 148ᵇ adapted to shape the head of the clothes-pin. The said knife is securely but adjustably and removably mounted in a knife holder 150, which knife holder at its end away from the lathe centers is pivotally mounted by means of pins 151 between two posts 152 rigidly secured to or integral with the front central portion of the top frame 17. The knife 148 is brought into operative position by being gradually lowered against the length of wood held between the lathe centers, it being understood that the lathe centers are revolving the said length of wood in the direction reverse of clock-wise movement as the parts are viewed in Fig. 5. The knife is yieldingly pressed down by a vertically movable rod 153, the lower end of which rests into a socket provided in the upper side of the knife holder toward the knife edge or almost above the length of wood in the lathe spindles 39. Downward tension to said rod 153 is imparted by means of a weight 154 secured to said rod. The rod 153 is loosely supported in mountings (not shown) above the weight 154 so that the foot of said rod may be removed when desired from its contact with the knife holder to allow the knife holder to be raised up from the machine when desired as for changing the knife or other purposes. The downward movement of knife 148 under its said gravity tension is gradually allowed to take place at the proper time by means of two vertical arms 155 bearing at their upper ends against the lower side of the pivotally mounted knife holder 150, which arms at their lower end are secured to the central part of a lever 156, the rear end of which is pivotally mounted between ears 157 projecting from the rear crosspiece 21, while the forward end of the said lever is provided with an anti-friction roller 158 resting upon the periphery 159 of cam wheel 36. One portion 160 of the periphery 159 of cam wheel 36 slants outward from the axis of said cam wheel, thus operating in an obvious manner to raise the knife 148 from operative position after the cutting operation has been performed and allowing time for the turned length of wood to be dropped from between the lathe centers and a new length of wood to be inserted therein. Following the said rising portion 160 in the order of its engagement with roller 158 is a portion 161 upon the periphery of said cam wheel 36 gradually sloping toward the axis of the cam wheel and operating in evident manner to allow the knife 148 to again swing downwardly into cutting position and to continue such downward movement very gradually as the said knife gradually turns the length of wood to circular shape and desired diameter. The lower ends of arms 155 are adjustably secured to lever 156 as by means of bolts and nuts 162 and 163 respectively, allowing an accurate adjustment of the knife relative to the lathe centers and relative to the cam wheel 36.

During the relatively long period while the knife 148 is turning down the length of wood to proper diameter the rod 75 has been moving to the front or toward the left, as viewed in Fig. 4, and thus as hereinbefore described causing the feed rollers 63 and 64 to advance the stick of wood therebetween a sufficient distance to have sawed therefrom the next length of wood. As soon as the turning operation by knife 148 is being completed, saw 108 is moved forward as hereinbefore described and cuts from the stick of wood the length projecting therefrom so that the platform 105 and pusher 133 are ready to advance the said length of wood as soon as the now completely turned preceding length of wood is released from between the lathe centers by said lathe centers moving away from each other through the spindle levers 46 having their rollers pass from engagement with the high portion 58 to low portion 56 of the cam groove 50 of cam wheels 35. The different operations already described in detail are then performed with positiveness and regularity and in the right relation to each other or with the proper sequence and so continue as long as the machine is operated, the only attention required by the machine being the feeding to the rollers 63 and 64 of lengths of wood. It will be noticed that the machine is adapted to receive sticks of wood of varying length and will consume the same without difficulty or change of operation. If the sticks of wood fed to the machine do not happen to saw up into even lengths of wood for the articles being made, the resulting short pieces of wood are disposed of without difficulty by dropping from between the lathe centers. As the lathe centers are disengaged from the turned length of wood, the said turned lengths drop of their own weight from between the lathe centers and are allowed to slide downwardly and forwardly of the machine through a chute (not shown) into a suitable receptacle or bin.

Aside from the movement of the positioning levers 141 being controlled by the forward movement of platform 105, it will be noticed that the different intermittently operating sub-mechanisms of this machine are each operated by its own independent line of connections with the cam shaft 31 and do not depend upon one another. For this reason any one of the said intermittently operating sub-mechanisms may be changed without interfering with the operation of others in order to obtain the proper relative action or in order to adjust the machine to somewhat varying classes of work. Such adjustment of the relative timing of said sub-mechanisms is obtained by moving the gear wheel 32 or the cam wheels 33, 34, 36 and 35 relatively backward or forward upon cam shaft 31 and fastening them in such new position by means of set screws 164 in the hub portions of said gear wheels or cam wheels.

In the same way and for the same reason the formation of the cam portions upon said cam wheels may be changed by adding to or subtracting from said cams or by substituting other cam wheels in order to adjust the machine for some different work without disorganizing the general system of the machine.

From the edge of the knife holder 150 that is toward the rear of the machine or that is nearest the lathe centers 42 there projects rearwardly of the machine an arm 165, upon the rearward edge of which are depending fingers 166 as shown in Fig. 5. The purpose of these fingers is to prevent the turned length of wood from flying upward or to the rear when the lathe centers are withdrawn from the turned length of wood. The great speed at which the wood is being rotated tends to cause it to fly out of the machine when released and this overhanging arm 165 and depending fingers 166 prevent such motion of the turned article and cause it to pass downward into the chute and out of the machine. The said arm and fingers being attached to the knife plate 150 begins to move up when the knife 148 has completed its work and so are raised far enough up to be out of the way when the platform 105 and pusher 133 advance the next short length of wood, but at the time when the turned length of wood is released the knife holder 150 and the arm 165 and fingers 166 are only moved part way to raised position and are still low enough to be effective in preventing the turned length of wood from flying up or to the rear.

What I claim as new and desire to secure by Letters Patent is:

1. In a wood working machine, the combination of two oppositely disposed feed rollers adapted to intermittently feed a stick of wood forward lengthwise, a platform adapted to support the projected length of said stick, an overhanging spring-tensioned holder on said platform adapted to hold the projected length of the stick on said platform, a saw adapted to advance and saw the projected length of the stick from the stick, two oppositely disposed lathe centers longitudinally movable relative to each other, guideways whereon said platform and the length of wood thereon may be moved toward said lathe centers and means to advance said platform whereby the length of wood is carried to position between the lathe centers and may be grasped endwise thereby.

2. In a wood working machine, the combination of two oppositely disposed feed rollers adapted to intermittently feed a stick of wood forward lengthwise, a platform adapted to support the projected length of said stick, an overhanging spring-tensioned holder on said platform adapted to hold the projected length of the stick on said platform, a saw adapted to advance and saw the projected length of the stick from the stick, two oppositely disposed lathe centers longitudinally movable relative to each other, guideways whereon said platform and the length of wood thereon may be moved toward said lathe centers, a pusher movably mounted between said platform and said overhanging holder and back of said length of wood and adapted to push the length of wood forward on said platform and means to advance said platform and pusher whereby the length of wood is carried to position between the lathe centers and may be grasped endwise thereby.

3. In a wood working machine, the combination of two oppositely disposed yieldingly-tensioned feed rollers adapted to intermittently feed a stick of wood forward lengthwise, a platform adapted to support the projected length of said stick, an overhanging spring-tensioned holder on said platform adapted to hold the projected length of the stick on said platform, an adjustably mounted stop engaging the end of the projected length of wood whereby the length thereof may be regulated, a saw adapted to advance and saw the projected length of the stick from the stick, two oppositely disposed lathe centers longitudinally movable relative to each other, guideways whereon said platform and the length of wood thereon may be moved toward said lathe centers and means to advance said platform whereby the length of wood is carried to position between the lathe centers and may be grasped endwise thereby.

4. In a wood working machine, the combination of two oppositely disposed feed rollers adapted to intermittently feed a stick of wood forward lengthwise, a platform adapted to support the projected length of said stick, an overhanging spring-tensioned holder on said platform adapted to hold the projected length of the stick on said platform, a saw adapted to advance and saw the projected length of the stick from the stick, two oppositely disposed lathe centers longitudinally movable relative to each other, guideways whereon the said platform and the length of wood thereon may be moved toward said lathe centers, stops separate from the platform movable into position beyond the lathe centers relative to the platform, and means for advancing said platform and stops whereby the length of wood is carried to centered position between the lathe centers and may be grasped endwise thereby.

5. In a wood working machine, the combination of two oppositely disposed feed rollers adapted to intermittently feed a stick of wood forward lengthwise, a platform adapted to support the projected length of said stick, an overhanging spring-tensioned holder on said platform adapted to hold the projected length of the stick on said platform, a saw adapted to advance and saw the projected length of the stick from the stick, two oppositely disposed lathe centers longitudinally movable relative to each other, guideways whereon the said platform and the length of wood thereon may be moved toward said lathe centers, a pusher movably mounted between said platform and said overhanging holder and back of said length of wood and adapted to push the length of wood forward on said platform, stops separate from the platform and pusher movable into position beyond the lathe centers relative to the platform, and means for advancing said platform, pusher and stops whereby the length of wood is carried to centered position between the lathe centers and may be grasped endwise thereby.

6. In a wood working machine, the combination of two oppositely disposed feed rollers adapted to intermittently feed a stick of wood forward lengthwise, a platform adapted to support the projected length of said stick, an overhanging spring tensioned holder on said platform adapted to hold the projected length of the stick on said platform, a saw adapted to advance and saw the projected length of the stick from the stick, two constantly rotating oppositely disposed lathe centers longitudinally movable relative to each other and provided with points adapted to rotate in the ends of the length of wood and therebehind provided with laterally extending projections, guideways whereon said platform and the length of wood thereon may be moved toward said lathe centers, means to advance said platform whereby the length of wood is carried to position between the lathe centers and may be grasped endwise thereby, means adapted to bring said lathe centers toward each other until the projecting points upon the lathe centers engage the length of wood, means adapted to withdraw said platform and holder from the length of wood in the lathe and means adapted to bring said lathe centers farther toward each other until the laterally extending projections thereon engage and rotate the length of wood.

7. In a wood working machine, the combination of two oppositely disposed feed rollers adapted to intermittently feed a stick of wood forward lengthwise, a platform adapted to support the projected length of said stick, an overhanging spring tensioned holder on said platform adapted to hold the projected length of the stick on said platform, a saw adapted to advance and saw the projected length of the stick from the stick, two constantly rotating oppositely disposed lathe centers longitudinally movable relative to each other and provided with points adapted to rotate in the ends of the length of wood and therebehind provided with laterally extending projections, guideways whereon said platform and the length of wood thereon may be moved toward said lathe centers, a pusher movably mounted between said platform and said overhanging holder and back of said length of wood and adapted to push the length of wood forward on said platform sidewise, means to advance said platform and pusher whereby the length of wood is carried sidewise to position between the lathe centers and may be grasped endwise thereby, means adapted to bring said lathe centers toward each other after the length of wood is therebetween until the projecting points upon the lathe centers engage the length of wood, means to withdraw said platform and pusher from the length of wood in the lathe and means adapted to bring said lathe centers farther toward each other until the laterally extending projections thereon engage and rotate the length of wood.

8. In a wood working machine, the combination of two oppositely disposed feed rollers adapted to intermittently feed a stick of wood forward lengthwise, a platform adapted to support the projected length of said stick, an overhanging spring tensioned holder on said platform adapted to hold the projected length of the stick on said platform, a saw adapted to advance and saw the projected length of the stick from the stick, two constantly rotating oppositely disposed lathe centers longitudinally movable relative to each other and provided with points adapted to rotate in the ends of the length of wood and therebehind provided with laterally extending projections, guideways whereon the said platform may be moved toward said lathe centers carrying the length of wood thereon sidewise toward said lathe centers, stops separate from the platform movable into position beyond the lathe centers relative to the platform, means for advancing said platform and means for moving said stops into operative position whereby the length of wood is carried to and stopped at centered position between the lathe centers and may be grasped endwise thereby, means adapted to bring said lathe centers toward each other until the projecting points thereupon engage the length of wood, means adapted to withdraw said platform and said stops from the length of wood and means adapted to bring said lathe centers farther toward each other until the laterally extending projections thereon engage and rotate the length of wood.

9. In a wood working machine, the combination of two oppositely disposed feed rollers adapted to intermittently feed a stick of wood forward lengthwise, a platform adapted to support the projected length of said stick, an overhanging spring tensioned holder on said platform adapted to hold the projected length of the stick on said platform, a saw adapted to advance and saw the projected length of the stick from the stick, two constantly rotating oppositely disposed lathe centers longitudinally movable relative to each other and provided with points adapted to rotate in the ends of the length of wood and therebehind provided with laterally extending projections, guideways whereon the said platform may be moved toward said lathe centers and the length of wood thereon may be moved sidewise toward said lathe centers, a pusher movably mounted between said platform and said overhanging holder and back of said length of wood and adapted to push the length of wood forward sidewise on said platform, stops separate from the platform and pusher movable into position beyond the lathe centers relative to the platform, means for advancing said platform and pusher and means for moving said stops to operative position whereby the length of wood is carried to and stopped at centered position between the lathe centers and may be grasped endwise thereby, means adapted to bring said lathe centers toward each other until the projecting points thereon engage the length of wood, means to withdraw said platform, holder and stops from the length of wood in the lathe and means adapted to bring said lathe centers farther toward each other until the laterally extending projections thereon engage and rotate the length of wood.

In witness whereof I have affixed my signature, in the presence of two witnesses, this 4 day of October, 1915.

CHARLES H. RHODES.

Witnesses:
HELEN E. OLIN,
HARRIET WILLIAMS.